June 27, 1944.　　　R. R. DONALDSON　　　2,352,312
PRESSURE RESPONSIVE DEVICE
Filed Dec. 31, 1941　　　6 Sheets-Sheet 1

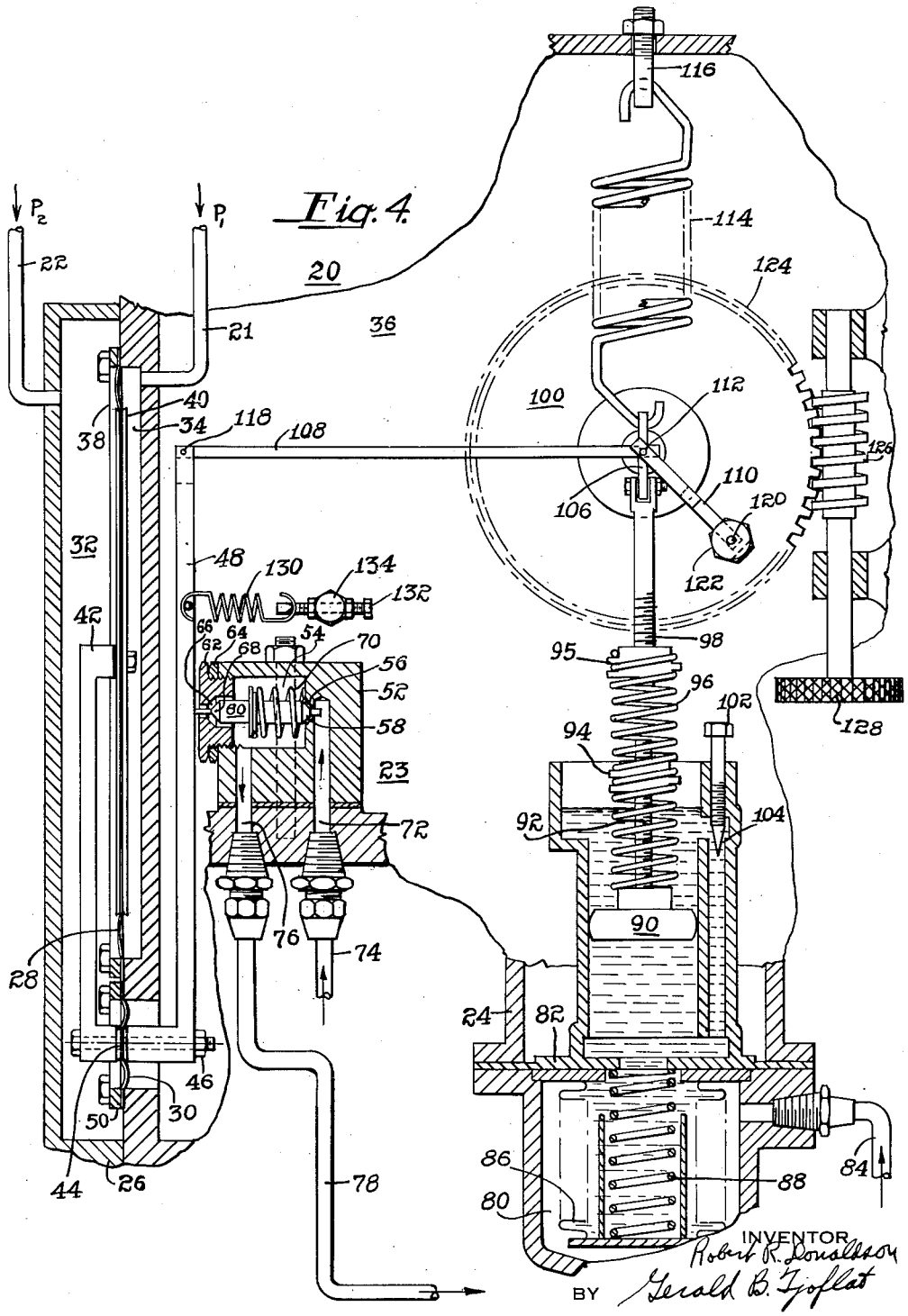

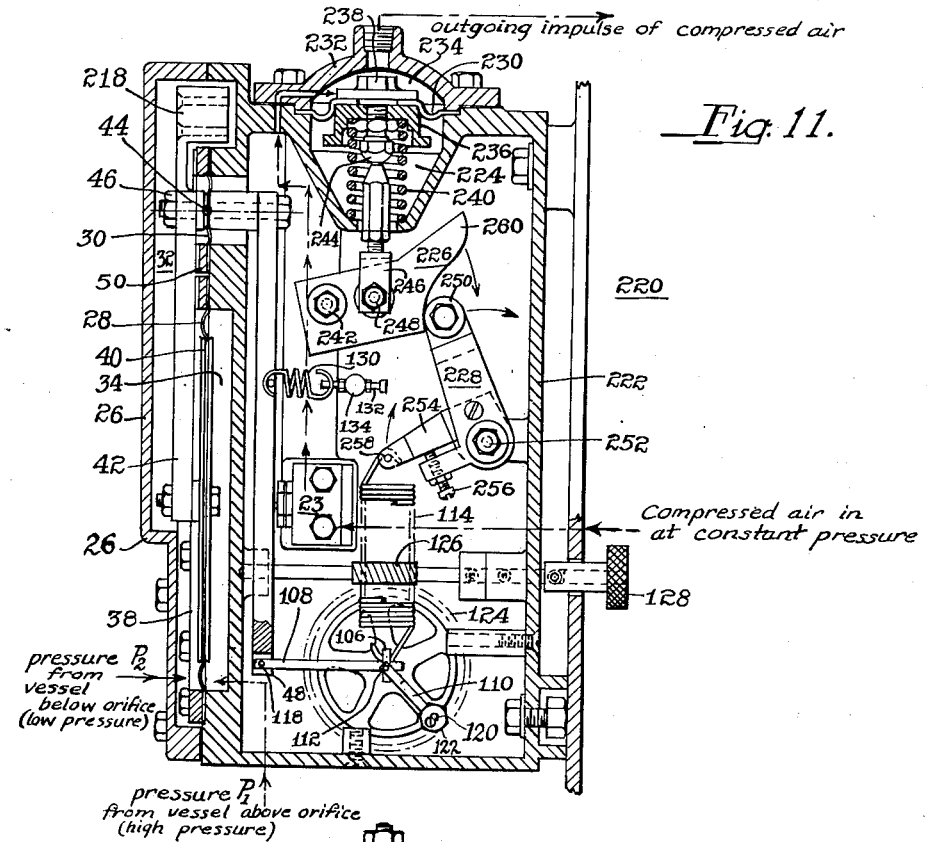

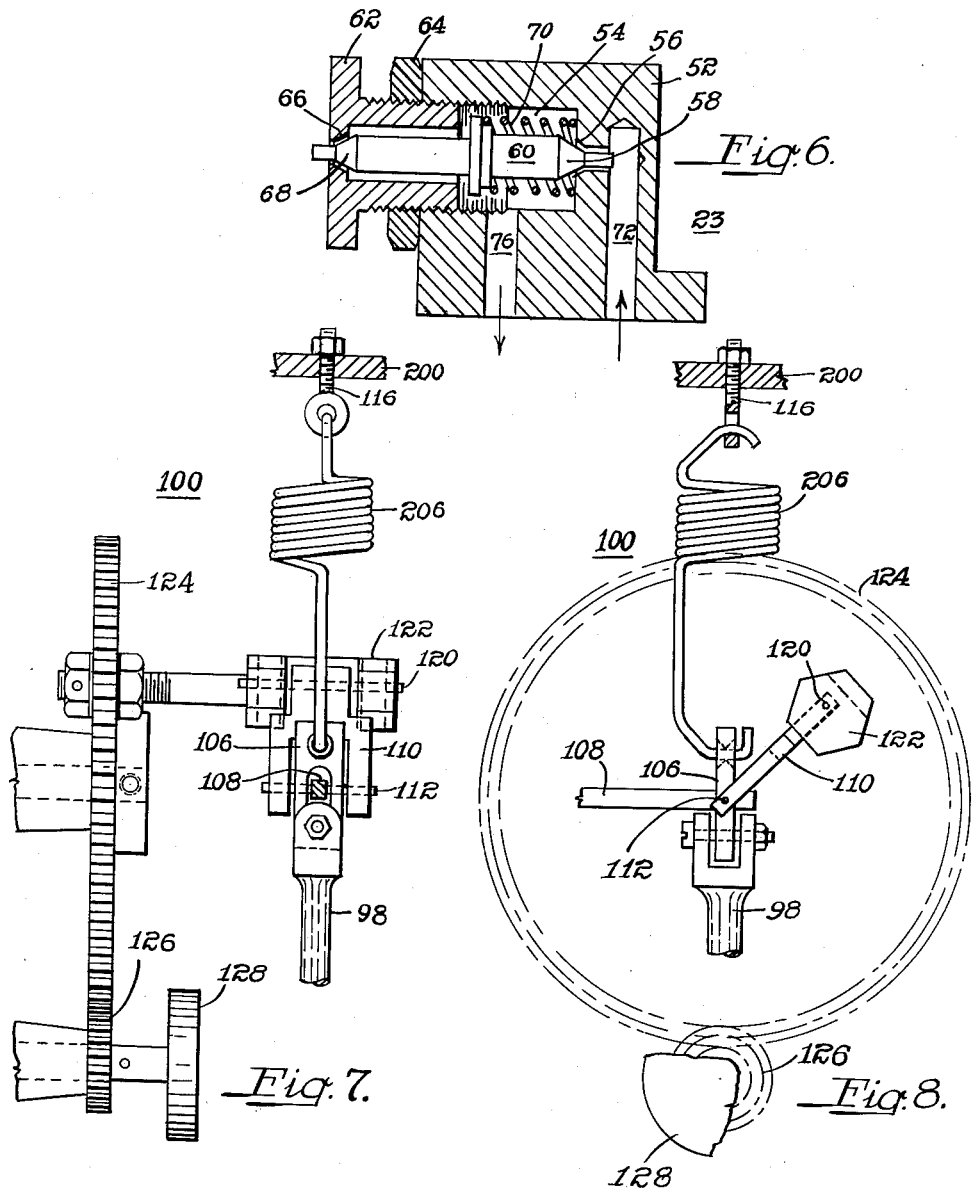

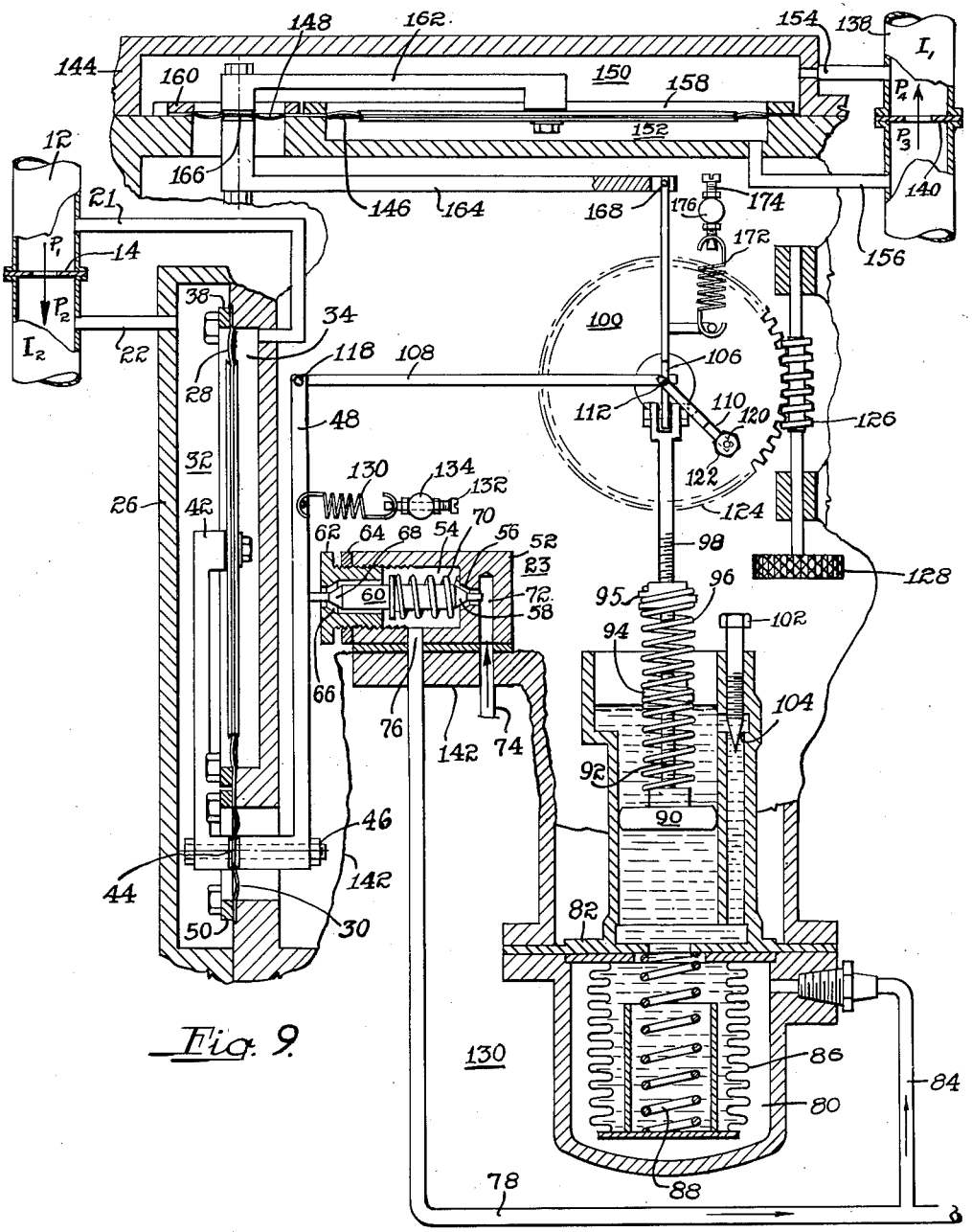

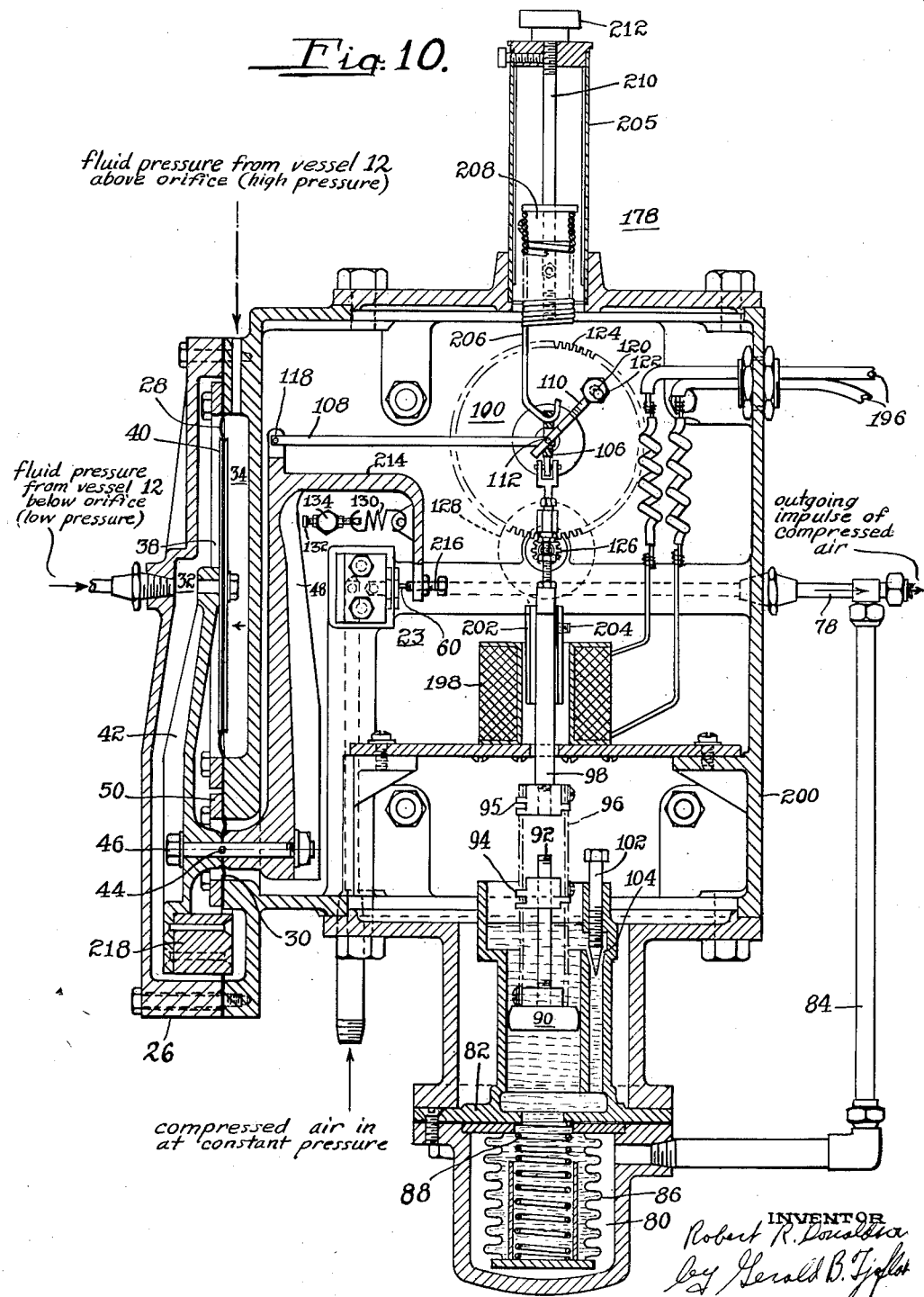

Patented June 27, 1944

2,352,312

UNITED STATES PATENT OFFICE 2,352,312

PRESSURE RESPONSIVE DEVICE

Robert R. Donaldson, Forest Hills, Pa.

Application December 31, 1941, Serial No. 425,166

10 Claims. (Cl. 83—93)

This invention relates to pressure sensitive devices for regulating and metering varying operative conditions in a control system in accordance with predetermined requirements and to methods bringing about such regulation and metering.

One object of this invention is to provide method and apparatus for controlling the momentary values of interdependent operative conditions in a manner that they satisfy the existing functional relationship between them, as well as the requirements some other operative condition imposes upon them in selectively variable dimensional magnitudes.

Another object is to provide method and apparatus of the character described which produce the controlled conditions in a steadily progressive, stable, practically non-oscillating manner, free from so called "hunting." Still another object is to provide method and apparatus for controlling interdependent operative conditions affecting their measurements in a selectively variable proportion, substantially according to a function of the tangent of an acute angle.

A further object is to provide method and apparatus for maintaining a substantially constant flow of a fluid through a conduit when the pressure of the fluid and its resistance to flow may be subject to fluctuations and change, said flow to be selectively variable.

A still further object is to provide method and means for maintaining a selectively adjustable ratio or relationship between the flow of fluids or gases or liquids in two or more different conduits.

Still a further object is to provide a pressure responsive apparatus which sends out pressure impulses of a compressed fluid in selectively variable mathematical functional relationship to the pressures responded to, said impulses remaining undisturbed by rocking or tilting of the apparatus.

Another object is to provide an apparatus of the kind mentioned which is simple in construction, sensitive, accurate and reliable in service and can be adjusted to the characteristics of the individual control systems, in which it is utilized, during operation.

I achieve these and other objects by establishing forces, the magnitude of which bear a predetermined functional relationship with the momentary values of the conditions controlled, finding their resultant in a substantially predetermined direction by loading these forces upon a linkage having a common oscillating pivot pin, employing control means issuing an impulse pressure responsive to the position of this pin for varying above mentioned forces, together with the values of the represented conditions, until the resultant of all forces becomes zero and the values of the conditions are the desired ones. Furthermore, by proper selection of the direction of the resultant, I am also able to vary at will the relative effectiveness, and with it select a desired ratio of the coordinated dimensional values, of the conditions regulated.

Other objects of the invention will in part be obvious from the following description taken in conjunction with the accompanying drawings in which:

Figure 1 is a diagram of the general arrangement of a control system employing one preferred embodiment of my invention, the system comprising a pipe line for conducting a flowing fluid, said pipe line being provided with an orifice and a valve or damper operated by a fluid motor which is controlled by a pressure responsive device or pressure regulator to maintain a substantially constant pressure drop across the orifice, hence substantially constant intensity of flow of the fluid through said pipe.

Figure 2 is the diagram of a control system utilizing a second embodiment of my invention, this system comprising two separate pipe lines through which fluids flow, each pipe line having an orifice therein; the intensity of the flow of one fluid in one pipe line being varied to satisfy certain requirements, a pressure responsive device or pressure regulator adapted to respond to the pressure drops across the orifices in the pipe lines and to control a fluid motor operated valve or damper in the other of said pipe lines so that the pressure differentials established across the two orifices and with it the respective intensities of the flow of the two fluids bear a predetermined but adjustable relationship to each other.

Figure 3 is the diagram of a control system based upon a third preferred embodiment of my invention, the system comprising a pipe line through which a fluid flows, a valve therein positioned by a fluid motor controlled by a master regulator influenced by the momentary fluid demand in the pipe line, an orifice and a regulator, responsive to the pressure drop thereacross and at the same time to the electromagnetic effect of an electric current flowing through an electric prime mover, the load upon which is in functional relationship with the intensity of the flow of the medium in said piping and said load being adjusted by said regulator to maintain said functional selectively variable relationship under varying fluid demand.

Figure 4 is an enlarged view of one preferred form of the invented pressure responsive device or regulator provided with a variable ratio device and a dashpot, shown partially in section, parts being broken away, this regulator being used in the control system shown in Figure 1.

Figure 5 is an enlarged semi-diagrammatic elevational view of the detached variable ratio device, an important structural feature employed in my invention, showing also the diagram of the acting forces.

Figure 6 is a view in section showing the details of construction, to a larger scale, of an escapement valve employed in the shown embodiments.

Figures 7 and 8 are more detailed views of the variable ratio device shown in Figure 5, in a modified arrangement.

Figure 9 is an enlarged sectional view of the chief structural elements, including the variable ratio device and the dashpot, of the invented regulator employed in the control system shown in Figure 2.

Figure 10 is the enlarged sectional view of the invented regulator used in the control system shown in Figure 3.

Figure 11 is a sectional view of a modified form of the invented regulator serving as a metering device in which the dashpot is omitted and a cam containing loading device, operated by the control impulse, is employed.

Throughout the drawings and specification like reference characters indicate like parts.

Figure 1:
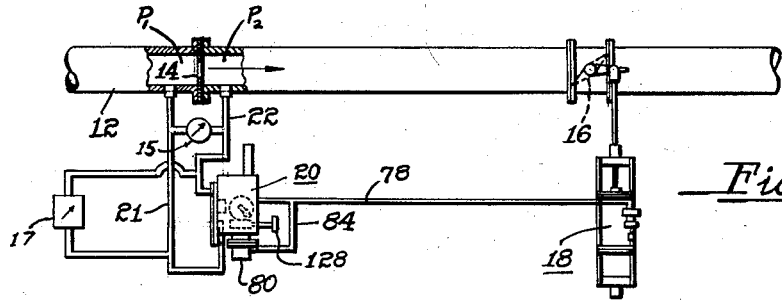

Referring to the drawings I have shown in Figure 1, a pipe line 12 through which a fluid, such as gas, air, or liquid flows in the direction of the arrow.

An orifice plate 14 is mounted in the pipe line whereby a pressure difference $(P_1-P_2)$, as indicated by pressure gauge 15, may be developed in accordance with or in response to the flow; $P_1$ being the fluid pressure upstream from the orifice and $P_2$ the pressure downstream from it, either or both of which pressures may be variable.

If it is desirable to maintain a constant difference between pressures $P_1$ and $P_2$, a damper or valve 16 is mounted in the pipe line 12 and so positioned by means of an operator or fluid motor 18 that the difference between $P_1$ and $P_2$ and with it also the flow, as indicated by flow meter 17, remain substantially constant. Fluid motor 18 is controlled by a regulator 20 embodying novel features of construction and arrangement of parts so shown in more detail in Figure 4. Regulator 20, connected by pipes 21 and 22 to pipe 12, responds to the differential pressure $(P_1-P_2)$ and is provided with a control element such as an escapement valve, generally designated by numeral 23, which governs the delivery of a control medium such as compressed air, to fluid motor 18 causing it to shift damper or valve 16 to positions that will maintain the intensity of the flow, hence the difference between varying pressures $(P_1-P_2)$ substantially constant, over the range of control of flow provided by the damper or valve 16.

The fluid motor 18 may be of any approved type but I prefer to use an operator of the type shown and described in U. S. Patent No. 2,044,936 granted June 23, 1936.

As shown in Figure 4, regulator 20 comprises a box-like housing 24 provided with a cover 26, a diaphragm 28, and sealing diaphragm 30. Diaphragm 28 divides the interior of the housing into a pressure tight chamber 32 which may be connected by pipe 22 to the downstream side of orifice 14, and a chamber 34 that may be connected by pipe 21 to the upstream side of orifice 14. Valve 23 and other hereafter described structural elements of the regulator are disposed within housing 24.

Diaphragm 28 is fastened at its periphery by a ring 38 and a number of screws, to housing 24, and at its middle portion by plates 40 and a central screw to a beam 42. Beam 42 is secured at 44 to the sealing diaphragm 30 and to an arm 48 by a bolt 46, forming a bellcrank fulcrumed at 44. Sealing diaphragm 30 is fastened to housing 24 by means of clamping ring 50 and suitable screws.

Escapement valve 23 comprises, as best shown in Figure 6, valve body 52 having a cylindrical bore 54 provided with an inlet port 56 disposed to act as a valve seat for tapered surface 58 of a valve stem 60. A plug 62 is threaded into valve body 52 and provided with a lock nut 64. Plug 62 is provided with an exhaust port 66 coacting with a tapered surface 68 on valve stem 60. A spring 70 urges stem 60 against arm 58 tending to close exhaust port 66 to the atmosphere and to fully open inlet port 56 to inlet duct 72 connected to piping 74, through which compressed air enters, as indicated by the arrow, from a suitable source (not shown) at constant pressure, say 50 lbs. per square inch. Valve stem 60 is positioned by arm 48 at all times and regulates the valve of control impulse delivered through outlet 76 to an impulse sending line. The value of pressure of the control impulse is a function of the position of surfaces 58 and 68 of valve stem 60 with respect to ports 56 and 66. The control impulse is conveyed in the direction of the arrows by impulse sending line 78 to points of control such as fluid motor 18 and to a bellows chamber 80 of dashpot 82; the bellows chamber being connected by pipe 84 to impulse line 78.

Bellows chamber 80 accommodates a bellows 86 which is compressed by the impulse pressure against the resistance of a spring 88 which tends to keep the bellows in full expanded position. The space inside of bellows 86 communicates with the cylindrical bore of dashpot 82 in which a piston 90 is reciprocably and adjustably mounted on a threaded piston rod 92 which is suspended from a spring 96 and spring nuts 94 and 95. Spring nut 95 is threaded on forked bar 98 which is hingedly connected to a variable ratio device, generally designated by numeral 100. This ratio device represents an important structural feature of my invention. The dashpot 82 is provided with a needle valve 102 which adjustably controls the free area of by-pass port 104 connecting the space on both sides of piston 90, which space contains a viscous fluid, such as oil. A detailed description of the construction and operation of the dashpot in connection with a regulator, is given in U. S. Patent No. 2,149,390, issued on March 7, 1939, for "Pressure regulating device."

The variable ratio device 100, illustrated to a somewhat larger scale in Figure 5 which also shows the diagram of forces acting thereon, comprises three links 106, 108, and 110, hinged together by a common pin 112. For better reference, I call links 106 and 108 the "component links" and link 110 the "resultant link" according to the forces acting primarily thereupon. Component link 106 is hingedly connected to forked bar 98 and also to spring 114 which is held to housing 24 with variable tension in the line of the axis of dashpot 82 by adjustable means, such as eyebolt 116. Component link 108 is pivotally connected by pin 118 to arm 48 and is substantially perpendicular to link 106. Resultant link 110 has preferably one forked end to accommodate oscillating pin 112 and the two component links, while its other end, of lesser width, is pivotally connected by pin 120 to a recessed end of post 122 protruding from mounting member 124, shown to be a wormgear, mounted in housing 24 rotatably and substantially coaxially with pin 112 in latter's middle position. Positioning member 126, shown to be a worm, coacting with wormgear 124, is rotatably supported by housing 24 and is provided with a suitable knob 128 to be turned. Spring 130, adjustably tensioned by screw 132, held in post 134 which is rigidly fixed to housing 24, balances substantially the turning moment of the pressures of spring 70 and that of the compressed air transmitted by valve stem 60 upon arm 48, about fulcrum point 44 whereby it substantially eliminates the error which would be otherwise caused by these pressures increasing the effect of $P_1-P_2$.

Figures 7 and 8 show the variable ratio device 100 in more details, employing for mounting member 124, a spur gear, and for positioning member 126 a pinion, instead of wormgear and worm, respectively, shown in Figure 4, also the resultant link 110 being positioned in the upper quadrant to conform with the device shown in Figure 10.

The purpose of the apparatus shown in Figures 1 and 4 is to maintain a constant pressure drop (say P) in the fluid flowing in pipe 12 through the orifice 14 and with it to keep the intensity of the flow of the fluid in the pipe constant (say I) in a manner that the control operations should not cause fluctuations or "hunting" in the regulated conditions. The described apparatus achieves this purpose in the following manner:

Differential pressure $P_1-P_2$ acts upon diaphragm 28 of the regulator 20, tending to turn counterclockwise about fulcrum 44, arm 48 which pulls on component link 108 with a force $F_1$ of a magnitude bearing a certain functional relationship with the momentary value of the pressure drop $P_1-P_2$, one of the interdependent conditions to be regulated. Graphical representation of the forces is shown in Figure 5. Accordingly, the magnitude of force $F_1$ is $\overline{AC}$, that of $F_2 \pm F_3$ is $\overline{AB}$ and that of their resultant, $R = \overline{BC}$. The tension of spring 114 is so adjusted that it pulls substantially perpendicularly to $F_1$ upon component link 106 with a force $F_2$ of the magnitude bearing a certain functional relationship with the intensity of the flow, the other of said conditions, plus offsetting the weight bearing on pin 112. In line with $F_2$ will act the stabilizing force $F_3$ of the dashpot, conveyed resiliently by springs 96 and bar 98, which force may be either in the same or in the opposite direction as $F_2$ in order to retard the effect of the variation of the force $F_1$. In case of equilibrium the stabilizing force already vanished, hence $F_3$ became zero and $F_2 \pm F_3 = F_2 = \overline{AB}$ as shown in Figure 5.

Considering the triangle ABC in the general case when links 106 and 108 are not perpendicular to each other and angles A, B, and C at the respective corners may be of any value and the length of the sides are measures of the forces $F_1$, $F_2$, and R, the following relations exist in equilibrium between the forces and the angles:

$$F_2 = R \cos B + F_1 \cos A$$
$$R = F_1 \cos C + F_2 \cos B$$
$$F_1 = F_2 \cos A + R \cos C$$

and the ratio of the component forces $F_2$ and $F_1$ is $$\frac{F_2}{F_1} = \frac{R \cos B + F_1 \cos A}{F_2 \cos A + R \cos C}$$

I prefer to arrange component links 106 and 108 substantially perpendicularly to each other in which case, with sufficiently close approximation, $C = 90°$ and $$\frac{F_2}{F_1} = \frac{R \cos B + F_1 \cos A}{F_2 \cos A + R \cos C} = \tan C$$

The resultant of these component forces, which are substantially perpendicular to each other, is, with sufficient accuracy $$R = \sqrt{F_1^2 + F_2^2}$$

and the reaction force, the stress developed in link 110, will equal $R_1 = -R$, link 110 taking the line of the resultant that oscillates pin 112 about pin 120.

Disregarding the practically negligible difference in deviation of the component links from the perpendicular to each other, (which difference can be made very small by proper dimensions of the parts) in case of equilibrium the sum of the forces $$\sqrt{F_1^2 + F_2^2} - R = 0$$

By varying angle C between 0° and 90°, I can vary the ratio between forces $F_1$ and $F_2$ substantially between zero and infinity, approximately according to a function of tangent C. In other words, I can provide practically any ratio desired between forces $F_1$ and $F_2$ and find a position of equilibrium by simply turning knob 128 and changing the value of angle C.

This variability of the ratio of the forces, meaning the variability of the effectiveness of the momentary values of the conditions, represented by said forces, makes possible, by positioning link 110, to select at will, during operation, the corrected value of the condition which is to be maintained.

For example, in a particular case the proper intensity I is maintained in pipe 12 when $C = 45°$ and $P_1 - P_2 = 2''$ of water column. In this case, tg $C = \tan 45° = 1$ and $F_1 = F_2 = 2M$ lbs., where M is a factor, say .25, depending upon the size of the diaphragm and the leverage, so that both $F_1$ and $F_2 = .25 \times 2 = .5$ lb.

I wish now to regulate the flow pipe 12 so that the intensity should become $I'$ corresponding to 8'' water column differential pressure (assuming that the dimensions of pipe 12 and valve 16 permit such increase of the flow). To set the regulator to maintain this increased differential pressure at orifice 14, angle C has to be adjusted so that $$\frac{F_2}{F_1} = \tan C = \frac{2M}{8M} = \frac{1}{4} \text{ and } C = 11° 2'$$

(with sufficient approximation).

Hence, in this exemplary case, changing the angle C between center lines of links 108 and 110 from 45° to 11° 2' will set regulator 20 to maintain in pipe 12 a differential pressure of 8" water column instead of 2" water column existing when C was 45°. Any other practicable differential pressure and corresponding flow intensity may be obtained by similar variation of angle C, following substantially a tangent curve.

In general, regulator 20 functions as follows:

Assuming that during operation $P_1-P_2$ equals the desired P (as indicated by a pressure gauge, 15); hence the intensity of flow of the fluid in pipe 12 is the desired I (as indicated by a flow meter, 17) then no change by the control apparatus is wanted and none is urged, as variable ratio device 100 is in equilibrium. Diaphragm 28, arm 48, oscillating pin 112, and accordingly, valve stem 60 also, will have a certain position in response to which the control impulse in piping 78 has a corresponding pressure, positioning the piston of fluid motor 18 which in turn keeps valve 16 set in the position in which P differential pressure was obtained at orifice 14. As long as conditions P and I remain, forces $F_1$ and $F_2$ do not vary, $F_3=0$ and the equilibrium of the variable ratio device is not disturbed.

Assuming now, that due to opening or closing of some valves (not shown) above or below orifice 14, the pressures $P_1$ or $P_2$ or both, are changed and with them the intensity of flow too, and that the new differential pressure $P_1-P_2=P'$ and the corresponding new flow intensity equals I'. Then if P' is greater than P, I' will be greater than I and the following changes take place in the apparatus:

Diaphragm 28, loaded by the greater P' tends to turn arm 48 counterclockwise about fulcrum 44 which pulls now with a greater $F_1'$ force upon component link 108, displacing oscillating pin 112 counterclockwise about pin 120, lowering component link 106, increasing somewhat (in this case practically negligibly) the tension of spring 114 which is force $F_2$ until new resultant force R' coincides with the new position of resultant link 110 at an angle C' to $F_1'$. As a result, valve stem 60 of escapement valve 23 will follow arm 48 under pressure of spring 70 and of the compressed air impinging upon the stem, opening up inlet port 56, and choking down exhaust port 66 in consequence of which the pressure of the control impulse in piping 78 will increase, moving the piston of fluid motor 18 to position valve 16 to choke down the flow of fluid, simultaneously decreasing P' accordingly. In the meantime, the increased impulse pressure, conveyed by branch pipe 84 to bellows chamber 80, compresses bellows 86 and, through medium of the oil, which cannot suddenly escape through the bypass port 104 in dashpot 82, moves piston 90 upwards compressing spring 96 and exerting an upward force $+F_3'$ (increasing $F_2'$) that opposes $F_1'$ inasmuch it tends to shift oscillating pin 112 and link 110 clockwise about pin 120. The effect of force $F_3'$ is that link 108 arm 48, and valve stem 60 move toward right, decreasing the pressure of the control impulse in piping 78 and slowing down the motion of the piston of fluid motor 18 and with it that of valve 16 and also the speed of the correction of P' and I' toward the desired values of P and I. The magnitude of force $F_3'$ is, however, decreasing due to gradual relaxation of spring 96 on account of escaping oil from underneath to above the piston 90 through port 104, so that within a time period, depending upon adjustment of needle valve 102, $F_3'$ becomes zero.

To prevent overtravel of fluid motor 18 and valve 16, hence avoid hunting, it is necessary that valve 16 arrive at the proper choking position in which it reduces P' to P and I' to I substantially at the moment when $F_3'$ becomes zero, otherwise this varying force would cause varying $F_1$ and $F_2$ forces and would prevent equilibrium at pin 112 of the variable ratio device 100; this would mean continued positioning of fluid motor 18 and of valve 16 constituting overtravel and hunting. The correlation of the speed of correction of P' and of the time period within which $F_3'$, the stabilizing force, becomes zero, is achieved by proper setting of needle valve 102 and suitable selection of the active number of turns of spring 96 by setting spring nuts 94 and 95.

Selecting the proper angle C by observing pressure gauge 15 and/or flow meter 17, the regulator is set to maintain the properly corrected values of the interdependent conditions of the pressure difference $P_1-P_2$ and the intensity of the flow I, as above explained.

In case the momentary value of $P_1-P_2$ becomes P" which is less than P, then force $F_1$ decreases to $F_1''$, diaphragm 28, arm 48, link 108, oscillating pin 112, and valve stem 60 will be shifted to the right, link 106 lifted, spring 114 slightly relaxed, force $F_2$ somewhat decreased to $F_2''$ and the pressure of the control impulse also decreased. In consequence, fluid motor 18 is started to open further valve 16 for increasing P" toward the desired P. In the meantime, bellows 86, under pressure of spring 88, expands, suck piston 90 downwardly, tensioning spring 96 and exerting a force $F_3''$ which opposes force $F_1''$ as the former tends to move 112 to the left and the latter to the right. The result is again that the motion of valve 16 and the correction of P" to P is retarded sufficiently so that the desired differential pressure P is reached at the moment when $F_3''$ becomes zero, hence, equilibrium at pin 112 and with it P and I is reestablished progressively without overtravel and hunting.

Figure 2:
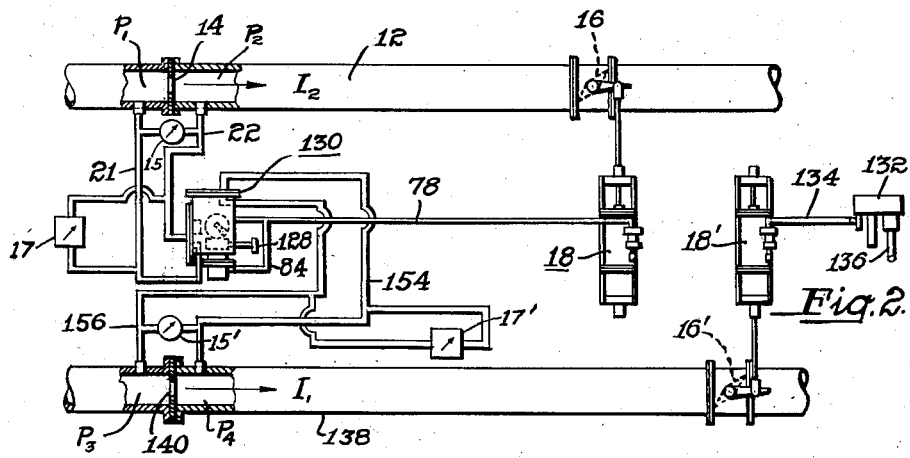

Fig. 9 shows a second embodiment of the regulator, generally designated by 130, which is used in the arrangement illustrated in Fig. 2.

In this control system, a fluid, say fuel gas, such as natural gas, coke oven gas, for use in a steam generating plant, flows in pipe 138 in the direction of the arrow, through orifice 140. The pressure drop $P_3-P_4$ through this orifice is varied by damper or valve 16 positioned by fluid motor 18' under influence of a control impulse from a known master sender 132, conveyed through piping 134, in response to a master impulse, say the pressure of the generated steam, reaching master sender 132 through piping 136. The pressure drop $P_3-P_4$ and the corresponding flow intensity $I_1$ in piping 138 is so regulated by valve 16' that it satisfies the momentary fuel requirement as determined by the steam demand and corresponding steam pressure variation. Another fluid, say air, necessary for the combustion of the fuel gas, is flowing in pipe 12 in the direction of the arrow through orifice 14, the pressure drop $P_1-P_2$ through which is regulated by damper or valve 16 positioned by fluid motor 18 controlled by regulator 130, so that the corresponding intensity of flow $I_2$ in pipe 12 is in a predetermined proportion K to intensity $I_1$ in pipe 138. Hence, $$\frac{I_2}{I_1}=K$$

15 and 15' are differential pressure gauges, and 17 and 17' flowmeters.

As shown in Fig. 9, regulator 130 comprises boxlike housing 142, shown broken away, which accommodates the parts described in connection with regulator 20 in Fig. 4, except spring 114, and the following new structures:

Cover 144 with diaphragm 146 and sealing diaphragm 148 form the sealed chambers 150 and 152, the former being connected through piping 154 with pipe 138 downstream to orifice 140, and latter, through piping 156, upstream to orifice 140, so that chamber 150 is under the lower pressure $P_4$ and chamber 152 under the higher pressure $P_3$ at all times. The diaphragms are fastened sealingly to housing 142 in the usual manner by peripheral rings 158 and 160, while at their center they are attached to beam 162 which is rigidly bolted to arm 164 forming a bell-crank fulcrumed at the center 166 of sealing diaphragm 148. Component link 106 of the variable ratio device 100 is pivotally suspended at pin 168 from arm 164. Spring 172, adjustably tensioned by screw 174 in post 176, which is rigidly attached to housing 142, balances the weight of the parts resting on oscillating pin 112.

This regulator operates in the same manner as regulator 20 shown in Fig. 4, except that the force $F_1$, due to the momentary differential pressure $P_1 - P_2$, respectively to the corresponding flow intensity $I_2$, is balanced at pin 112 by a force $F_2$ which is in functional relationship with the differential pressure $P_3 - P_4$, respectively with its interdependent intensity of flow $I_1$. The angular position of resultant link 110 to component link 108 or the magnitude of angle C will determine the ratio between the balancing forces $F_1$, $F_2$, and also that of the flow intensities $I_1$ and $I_2$.

Resultant link 110 is positioned and angle C varied by wormgear 124 and worm 126, rotatably held in housing 142, gear 124 being coaxial with floating pin 112 at the latter's middle position. The position of valve stem 60 of escapement valve 23, hence also the pressure of the control impulse in piping 78 and with it the position of the piston of fluid motor 18 and that of the valve 16, are determined by the position of the oscillating pin 112. Consequently, at the moment equilibrium is obtained between forces $F_1$, $F_2$, and $R_1$ at pin 112—the stabilizing force $F_3$ becoming zero—$I_2$ becomes $kI_1$, the desired value, and any further correction, overtravel or hunting is eliminated.

Any desired ratio between the intensities of the flow of the two different fluids, respectively any value of $k = f$ (tan $C$) (substantially) may be obtained by setting resultant link 110 at the proper angle C by turning knob 128 that positions worm 126 and gear 124. It is obvious that the described apparatus can regulate the proportional flow not only between fuel and air but between different kind of fuels or between any kind of fluids whatsoever.

Figure 3:
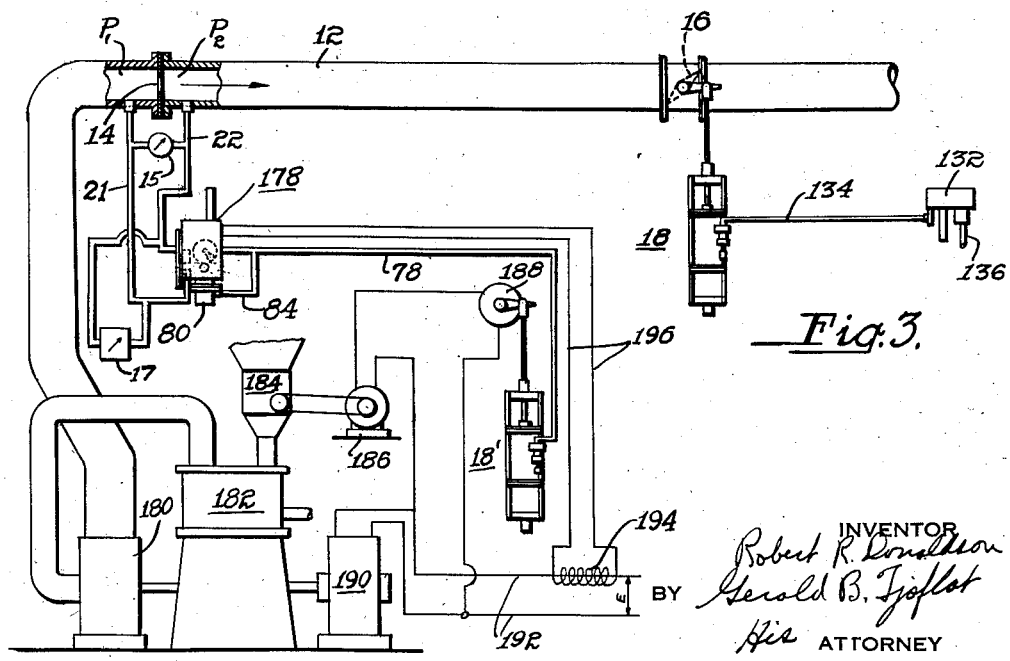

Fig. 10 shows the third embodiment of the invented regulator, generally designated by 178, used in the control system shown in Fig. 3. In this system air, carrying pulverized coal, is driven by fan 180 in pipe 12 in the direction of the arrow, toward burners of a steam boiler (not shown). Damper or valve 16, positioned in pipe 12 by fluid motor 18 according to the control impulse received through piping 134 from master control 132 in response to the steam pressure variation conveyed by piping 136, regulates the pressure drop $P_1 - P_2$ at orifice 14 so that the corresponding intensity of flow should satisfy the momentary fuel demand as required by the steam load, indicated by the variation of the steam pressure. The coal is pulverized by a mill 182 of suitable type which grinds the coal furnished by feeder 184, driven at proper speed by electric motor 186, the speed of which motor can be varied by rheostat 188, positioned by fluid motor 18', in response to the control impulse received through piping 78 from the regulator generally designated by the numeral 178. Fan 180 sucks through mill 182 the air that picks up the pulverized coal and carries it away suspended therein. Fan 180 and mill 182 are driven by electric motor 190, which, together with motor 186 receive the necessary electric current through electric leads 192 at the pressure E volts from a suitable outside source, not shown. A current transformer 194, in electric contact with leads 192, is connected by conductors 196 to solenoid coil 198 in regulator 178 as shown in Fig. 10.

Regulator 178 comprises boxlike housing 200 which accommodates with little exception, the same parts as regulator 20, though some of them are somewhat differently shaped and besides these, it contains also solenoid coil 198 and the magnetic core 202 adjustably attached by set screw 204 to bar 98 which connects link 106 to spring 96 of dashpot 82. Instead of spring 114 of Fig. 4, supplying there a force $F_2$, here a spring 206 is employed for balancing the weight upon pin 112 and is held with adjustable tension in a spring shield 205 by spring nut 208 and threaded bar 210 positioned by thumb nut 212 for regulating the tension of the spring to balance the weight exactly. Spur gear 124 carrying pivotally resultant link 110, is rotatably mounted in housing 200, substantially coaxially with the middle position of pin 112; pinion 126, turnable by knob 128, is held in cooperative position with spur gear 124. As force $F_2$ here is exerted by electromagnetic attraction between solenoid coil 198 and magnetic core 202, acting downwardly from pin 112, escapement valve 23 is in reversed position and resultant link 110 is placed in an upper quadrant of gear 124 to accomplish the corresponding displacement of valve stem 60 in an opposite direction to that one executed by regulator 20, in Fig. 4. For this purpose arm 48 is provided with an extension 214 carrying adjusting screw 216 locked thereto, which screw contacts and positions valve stem 60 in accordance with the position of oscillating pin 112. Beam 42, fastened to arm 48 by bolt 46 forming a bellcrank with fulcrum point at 44, indicated by a small circle in Fig. 10 in the center of sealing diaphragm 30, is provided with a counterweight 218 of suitable dimensions to bring the center of gravity of the swinging parts 28, 40, 42, 46, and 48 into the fulcrum point 44 in order to eliminate any gravitational moment which would vary with the different positions of these parts and would cause an error in the regulation by influencing the magnitude of the force $F_1$. It is obvious that this balancing of the pivoting parts may be effected in every embodiment of my invention. This feature has particular importance in diaphragm operated apparatuses used in moving structures such as ships, airplanes, motor vehicles, etc., exposed to rocking and tilting.

The variable ratio device 100, in which the resultant link 110 is arranged in an upper quadrant and force $F_2$ acts downwardly from floating pin 112, is shown in greater detail to a larger scale in Figs. 7 and 8, in which, for the sake of simplicity, spring 206 is shown to be held adjustably by eyebolt 116 to housing 200.

The apparatus shown in Figs. 3 and 10 functions as follows:

The differential pressure $P_1-P_2$ is varied by master sender 132 in response to the steam demand on the boiler, not shown, determining the momentary requirement of powdered coal and air and with it the necessary momentary intensity of flow in pipe 12. The pressure drop $P_1-P_2$ causes the pulling force $F_1$ on component link 108 in the direction to the left from the oscillating pin 112 moving the pin 112 toward the left and clockwise about the pin 120. The intensity of the flow of air and with it the quantity of pulverized coal carried by it (the output of the mill) is in functional relationship with the pressure drop $P_1-P_2$; and so will be the rate of feed of necessary coal corresponding to this output determining the momentary power requirement of motor 190, hence the intensity or amperage of the consumed electric current and the magnitude of the developed force $F_2$.

Assuming that the intensity of the air flow in pipe 12 and the pulverized coal carried thereby satisfy the momentary fuel requirement of the load on the boiler, then motor 186 is driving coal feeder 184 with the correct speed delivering coal to the grinding mill 182 at the necessary rate to maintain the proper pulverized coal content of the air at that flow intensity. In such case motor 190 requires a certain intensity of current flowing through leads 192 which will induce a corresponding current say of S-amperes in current transformer 194 activating solenoid coil 198 which will pull on magnetic core 202 and on link 106 connected thereto with a force $F_2$ that balances force $F_1$ at floating pin 112 at the established position of resultant link 110.

Should the load on the boiler increase and the steam pressure in pipe 136 fall, master sender 132 issues an impulse opening further valve 16 causing an increase in the momentary value of $P_1-P_2$, hence, in that of force $F_1$ acting on component link 108. In consequence, floating pin 112 will move toward the left and clockwise about pin 120; valve stem 60 will move also to the left but in this reversed position toward its inlet port, choking it down, decreasing the pressure of the control impulse entering piping 78 and setting the piston of fluid motor 18' into motion to start rheostat 188 toward a position in which the speed of motor 186 would deliver coal to mill 182 at the higher rate corresponding to the increased intensity of air flow answering the increased fuel demand. The decreased pressure of the control impulse in piping 78 is conveyed through piping 84 to bellows 86 in bellows chamber 80 causing a downward force $F_3$ of gradually vanishing magnitude opposing the effect of force $F_1$. Mill 182 being of suitable type, the increase in the rate of coal feed increases the power requirements of motor 190, hence, also the amperage S in solenoid 198 and with it the electromagnetic attraction on core 202, supplying force $F_2$.

As in the previously described embodiments in connection with Figs. 4 and 9, force $F_3$ retards the positioning of the piston of fluid motor 18' and with it the aimed at setting of rheostat 188 so that the resultant of all forces acting on floating pin 112 becomes zero and equilibrium at the variable ratio device 100 is established between forces $F_1$ (corresponding to the new, greater magnitude of $P_1-P_2$ as set by the master sender 132) and $F_2$ (corresponding to the increased rate of coal feed and to the resulting greater amperage S as set by fluid motor 18' and rheostat 188 in response to the decreased pressure of the control impulse in piping 78) substantially at the same instant when force $F_3$ becomes zero.

Should the load on the boiler now increase, the regulator effects similar steps of control in the opposite direction to that previously described resulting again in continuous, progressive and quick regulation of the conditions to be corrected establishing the proper correlated values of momentary fuel demand and pulverized coal output of the grinding mill without overtravel and hunting.

Suitably positioning resultant link 110 in the described manner, by varying angle C, any ratio may be obtained between intensity of airflow or the necessary fuel requirement and the rate of feeding coal into the pulverizing mill, hence the proportion of the pulverized coal to the carrying air can be varied at will between practical limits, insuring most economical operation with coals of varying fuel values. Again, the ratio between the regulated conditions may be varied according to a function of the tangent of the acute angle C by varying the angular position of link 110.

Fig. 11 shows a modification of the invented regulator, generally designated by 220, serving as a metering device and issuing control impulses of compressed fluid, the pressure of which impulses bears a predetermined functional relationship to the momentary value of the measured condition.

This regulator comprises boxlike housing 222 containing, with the exception of the dashpot and the parts therein, the same structures as regulator 20 in Fig. 4, and in addition thereto a second pressure responsive device 224 and a cam 226 operated bellcrank 228, tensioning spring 114.

Omitting the description of the parts common with the previously disclosed embodiments and referred to by the same numerals, the new parts employed in this embodiment are:

Diaphragm 230, forming with cover 232 the sealed chamber 234 into which the control impulse from escapement valve 23 is conducted and from which the outgoing impulse issues, as shown by dotted arrows. Diaphragm seat 236 and post 238 clamp the central portion of diaphragm 230 and position, against the pressure $F_c$ of suitably dimensioned spring 240, cam 226 which is pivotally mounted by screw 242 in housing 222. Post 238 is provided with ball-joint 244 and forked end 246 which is linked to cam 226 by screw 248 permitting oscillation of the cam about screw 242. Roller 250 is rotatably mounted on bellcrank 228 which is pivoting about screw 252 and has a forked pivoting arm 254 adjustably attached thereto by locked screw 256. Forked arm 254 has pin 258 which engages extension spring 114 and tensions it with a force $F_t$ pulling on component link 106. All pivoting parts are preferably provided with antifriction bearings not shown.

Face 260 of cam 226 is shaped to form a profile which will position bellcrank 228 and pin 258 relative to diaphragm 230 so that forces $F_c$ and $F_t$ are in a predetermined functional relationship with each other, hence, $$F_c = f(F_t)$$

The diaphragm 28 is subjected to the differential pressure $P_1-P_2$ at an orifice, not shown. As previously explained $F_1 = M(P_1-P_2)$ where M is a constant factor and $$\frac{F_t}{F_1} = \tan C$$

hence, $F_t = F_1 \tan C = M(P_1-P_2) \tan C$ and $F_c = f[M(P_1-P_2) \tan C]$.

Inasmuch as the pressure of the outgoing impulse $P_1$ multiplied by the effective area $A$ of diaphragm 230 balances the pressure $F_c$ and the moment $bF_t$ of the tension $F_t$ ($b$ being a suitable factor depending upon the dimensions of the parts)

$$AP_i = f[M(P_1-P_2)\tan C] + bM(P_1-P_2)\tan C$$

and $$P_i = f\frac{[M(P_1-P_2)\tan C] + bM(P_1-P_2)\tan C}{A}$$

In other words the pressure of the control impulse issued from this regulator will bear a functional relationship to the measured pressure difference, the function being predetermined according to the selected profile of the face of the cam 226 and having tan C as independent variable. Varying angle C by positioning resultant link 110 in turning knob 128 and with it worm 126 and gear 124, an infinite number of values of the predetermined functional relationship between observed differential pressure and issuing control impulse can be obtained substantially according to the variation of the tangent of an acute angle.

It is obvious that by proper selection of springs 240 and 114 and of the profile 260 of cam 226, any observed variation of pressure may be expressed in terms of acting pressure or force according to any desired function in which tan C is an independent variable; and not only can this be utilized to operate known indicators or recorders but any desired control—or other work can be accomplished in cooperation with a multitude of known pressure utilizing devices responsive to the impulse pressure of this regulator, respectively metering device.

While I have fully disclosed my invention and explained its operation with reference to preferred embodiments, it will be understood that these serve as illustrative examples only and should not be construed as limitations of my invention which should be limited only by the prior art and the appended claims.

What I claim as new and desire to secure by Letters Patent is:

1. A control device for regulating interdependent variable conditions to assume selectively variable values satisfying the requirements imposed by some other condition, said device comprising an oscillatably mounted pin and two component links and one resultant link pivotally mounted on said oscillatably mounted pin, loading means for exerting upon said component links forces characteristic of and bearing predetermined functional relationship to the momentary values of said interdependent conditions, said loading means exerting forces which pull said component links away from, and in a perpendicular direction to the axis of said pin, pressure responsive stabilizer means for adding a temporary retarding force of diminishing value to said forces, a supporting member mounted rotatably and substantially coaxially with said pin at its middle position, said resultant link being pivotally mounted on said supporting member, positioning means for changing the angular position of said supporting member and that of said resultant link for varying the ratio of the balancing magnitudes of said forces, a source of supply of fluid medium control means actuated in accordance with changes in the position of said oscillating pin for delivering and controlling the value of pressure at which said pressure medium is delivered to said stabilizer means, the value of pressure delivered to said stabilizer means becoming steady when the forces exerted on said pin by and through said component and resultant links are in balance.

2. A control device for regulating interdependent variable conditions to assume selectively variable values satisfying the requirements imposed by some other condition, said device comprising an oscillatably mounted pin and two component links and one resultant link pivotally mounted on said oscillatably mounted pin, loading means for exerting upon said component links forces characteristic of and bearing predetermined functional relationship to the momentary values of said interdependent conditions, pulling said component links away from, and in a perpendicular direction to the axis of said pin, and also substantially perpendicular to each other, pressure responsive stabilizer means for adding a temporary retarding force of diminishing value to said forces, a supporting member mounted rotatably and substantially coaxially with said pin at its middle position, said resultant link being pivotally mounted on said supporting member, positioning means for changing the angular position of said supporting member and that of said resultant link for varying the ratio of the balancing magnitudes of said forces substantially according to the variation of the tangent of the acute angle formed by one of said forces with said resultant link, a source of supply of fluid medium under pressure, and control means actuated in accordance with changes in the position of said oscillating pin for delivering and controlling the value of pressure at which said pressure medium is delivered to said stabilizer means, the value of pressure delivered to said stabilizer means becoming steady when the forces exerted on said pin by and through said component and resultant links are in balance.

3. Control apparatus according to claim 2 in which said loading means comprise a fluid pressure responsive device exerting force upon one of said component links, the magnitude of said force being in functional relationship with the momentary value of the pressure drop in a fluid flowing in a vessel through a resistance such as an orifice, and a spring connected to and exerting a force upon the other of said component links, the magnitude of which last mentioned force opposing the force exerted by said pressure responsive device and in proportion to the displacement thereof by said pressure drop.

4. Control apparatus according to claim 2 in which said loading means comprise two fluid pressure responsive devices, each exerting pull respectively upon one of said component links, the magnitude of said pulls being in functional relationship with the momentary values of said interdependent conditions, said stabilizing means comprising a dashpot having a piston reciprocably accommodated therein and resiliently attached to one of said component links for displacing a fluid, such as oil, through an adjustable bypass in response to a pressure impulse acting upon said fluid, and said source is one supplying compressed air at constant pressure, and said control means comprising an escapement valve regulating the pressure of the issuing impulse of said compressed air, said impulse acting upon said dashpot.

5. Control apparatus according to claim 2 in which said loading means comprise a pressure differential responsive device operatively connected to one of said component links and to exert a force on said pin that varies with the pressure differential acting on said pressure differential responsive device, and an electric current responsive device having a coil disposed to be energized by electric current and an armature operatively connected by the other component link to said oscillatably mounted pin and disposed to exert a force thereon tending to turn said resultant link, the force exerted by said armature varying with the value of current in said coil, said stabilizing means comprising a dashpot, with a piston reciprocably mounted therein, means resiliently connecting said piston to one of said component links for displacing a fluid, such as oil, through an adjustable bypass in response to a pressure impulse acting upon said fluid, and said source is one supplying compressed air at constant pressure, and said control means comprises an escapement valve operatively connected to said links for transmitting a control pressure the value of which varies in accordance with the displacement of said oscillatably mounted pin as caused by the sum total of forces acting thereon.

6. In a control apparatus, for comparing momentary values of interdependent conditions at a selected ratio of effectiveness, a variable ratio device comprising a pin, and two component links mounted substantially at a right angle to each other and a resultant link, each of said component links being pivotally connected to said pin, said pin being carried by said resultant link, a mounting member substantially coaxially rotatably arranged as to said pin at its middle position, means to attach said resultant link pivotally to said member, means for rotating said mounting member and turning said resultant link about said pin, loading means connected to said component links for exerting forces thereon the magnitude of each of which bears a predetermined functional relationship to the value of one of said interdependent conditions, and fluid pressure control means disposed for operation by said loading means and links in accordance with the displacement of said pin, said fluid pressure control means delivering a fluid pressure control force that varies in magnitude in accordance with said pin displacement.

7. A variable ratio device according to claim 6 in which said loading means comprise a first fluid pressure responsive device connected to one of said component links and being influenced by the momentary value of one of said conditions and a second fluid pressure responsive device acted upon by said fluid pressure control force, and a cam mechanism operatively and resiliently connecting another of said component links and said second fluid pressure responsive device the working face of which cam mechanism is suitably shaped to establish the desired functional relationship between the momentary value of a condition and that of said fluid pressure control force.

8. A regulator for correcting in a pipe line the intensity of the flow of fluid and its differential pressure at an orifice to assume substantially without fluctuation, selectively variable values to be maintained, said regulator comprising a pin and two component links and one resultant link, said pin forming one common pivotal connection between said component and resultant links, a rotatably mounted support member for said resultant link, the axis of said support member being substantially coaxial with said pin when the pin is in its middle position, means to attach said resultant link pivotally to said support member, means for rotating said member and thereby turning said resultant link about said pin, an airtight chamber having therein a diaphragm responsive to said differential pressure, a lever connected to one of said component links and to said diaphragm, an adjustably tensioned spring connected to the other of said component links in substantially perpendicular direction to the first component link, a source of supply of compressed air at constant pressure, an escapement valve connected to said source and operatively connected to said lever for issuing control impulses from said source at pressures that vary with the displacement of said pin by the action of said diaphragm and spring on said component and resultant links, and a dashpot having a piston and a displaceable liquid therein, means resiliently connecting the piston to one of said component links, said dashpot exerting a stabilizing force through its spring and component link on said pin.

9. A regulator for correcting in a pipe line having an orifice therein, the intensity of the flow of fluid and its differential pressure at said orifice to assume substantially without fluctuation, values of selectively variable proportionality with respect to the intensity of the flow of another fluid in another pipe line having an orifice therein, said regulator comprising a pin, two component links, and one resultant link, said pin connecting said links and forming one common pivot point therefor, a rotatably supported mounting member for said resultant link, said resultant link being pivotally secured to said mounting member and so positioned that the pin is substantially coaxial with the axis of said mounting member, means for turning said mounting member whereby said resultant link is turned about said pin, two diaphragms, a pressure tight chamber for each diaphragm, one of which diaphragms is responsive to the pressure differential across the orifice in one of said pipes, and the other diaphragm being responsive to the pressure differential across the other of said orifices, a bellcrank for each diaphragm for operatively connecting the same to said component links, a sealing diaphragm for each chamber, said bellcranks being fulcrumed on said sealing diaphragm and exerting forces on said component links in substantially perpendicular direction to each other, a source of supply of compressed air at constant pressure, an escapement valve coacting with one of said bellcranks for issuing a control impulse from said source at pressures that vary with the displacement of said pin by the action of said diaphragms and links, and a dashpot having a cylinder and a piston reciprocably accommodated therein, means for resiliently connecting said piston to one of said component links, a restricted by-pass communicating with said cylinder at opposite sides of the piston, liquid in said cylinder, and means responsive to the pressures issuing from said escapement valve for displacing said liquid to thereby exert a displacing force on said piston, said displacing force being gradually diminished and dissipated through said by-pass.

10. A regulator for selectively correlating the output of a coal pulverizing mill driven by an electric motor to the varying intensity of the flow of air carrying said output in suspension through an orificed pipe line to satisfy the varying momentary fuel requirement substantially without hunting, said regulator comprising a pin and two component links and one resultant link, said pin connecting said links and forming one common pivot point therefor, a rotatably supported mounting member for said resultant link, means for rotatably securing said resultant link to said mounting member, said resultant being so positioned that the pin is substantially coaxial with the axis of said mounting member, means for turning said mounting member, an airtight chamber having a diaphragm therein responsive to a differential pressure across the orifice in said pipe line, a sealing diaphragm for said chamber, a bellcrank fulcrumed on said sealing diaphragm and to one of said component links and to said pressure differential diaphragm, an electromagnetic device responsive to the load current on said mill motor and connected to said second component link for exerting a force thereon in substantially perpendicular direction to the first component link, the force of said electromagnetic device being proportional to the load on the mill motor, an adjustably tensioned spring supporting the weight acting upon said pin, a source of supply of compressed air at constant pressure, an escapement valve coacting with said bellcrank for issuing a control impulse from said source at a pressure correlated with the position of said pin, and a dashpot having fluid therein and a piston reciprocably accommodated therein, means resiliently connecting said piston to other of said component links for displacing said fluid, an adjustable restricted by-pass associated with said dashpot, means responsive to said control impulse and acting to displace said fluid, thereby exerting a force on said piston that gradually diminishes and is dissipated in said by-pass, and means responsive to said control impulse for regulating the rate of feed of coal into said mill.

ROBERT R. DONALDSON.